US012677741B2

(12) United States Patent     (10) Patent No.:     US 12,677,741 B2
Dapper et al.                      (45) Date of Patent:        Jul. 14, 2026

(54) BASECUTTER HEIGHT CALIBRATION FOR SUGARCANE HARVESTERS

(71) Applicant: AGCO DO BRASIL SOLUÇÕES AGRÍCOLAS LTDA, Ribeireo Preto (BR)

(72) Inventors: Roque Eduardo Dapper, Canoas (BR); Renan Kadiama, Canoas (BR); Gregório Kaminski, Canoas (BR)

(73) Assignee: AGCO do Brasil Soluções Agrícolas Ltda, Ribeireo Preto (BR)

( * ) Notice: Subject to any disclaimer, the term of this patent is extended or adjusted under 35 U.S.C. 154(b) by 831 days.

(21) Appl. No.: 18/002,462

(22) PCT Filed: Jun. 12, 2021

(86) PCT No.: PCT/IB2021/055188
   § 371 (c)(1),
   (2) Date: Dec. 19, 2022

(87) PCT Pub. No.: WO2022/003461
   PCT Pub. Date: Jan. 6, 2022

(65) Prior Publication Data
   US 2024/0008396 A1     Jan. 11, 2024

Related U.S. Application Data

(60) Provisional application No. 63/047,354, filed on Jul. 2, 2020.

(51) Int. Cl.
   *A01D 45/10*     (2006.01)
   *A01D 34/00*     (2006.01)
   (Continued)

(52) U.S. Cl.
   CPC ........... *A01D 45/10* (2013.01); *A01D 34/006* (2013.01); *A01D 34/74* (2013.01);
   (Continued)

(58) Field of Classification Search
   CPC ...... A01D 45/10; A01D 34/006; A01D 34/74; A01D 41/1217; A01D 41/127
   (Continued)

(56) References Cited

U.S. PATENT DOCUMENTS 6,272,819 B1 *   8/2001   Wendte .............. A01D 41/1274
                                              56/11.9
7,540,129 B2     6/2009   Kormann
                (Continued)

FOREIGN PATENT DOCUMENTS

BR     202013031434 U2 *   1/2016   ............. A01D 45/10

OTHER PUBLICATIONS

BR202013031434U2 English Translated (Year: 2020).*
(Continued)

*Primary Examiner* — Kenneth M Dunne
*Assistant Examiner* — Brian K Palmarchuk

(57)     ABSTRACT

A sugarcane harvester includes a basecutter assembly for cutting sugarcane stalks from sugarcane plants; a chopping section for receiving the sugarcane stalks from the intake and cutting assembly and chopping the sugarcane stalks into billets; a discharge assembly for receiving the billets from the chopping section and discharging the billets to a storage vehicle; and a height adjustment system for automatically calibrating an operational height of the basecutter assembly.

15 Claims, 3 Drawing Sheets

(51) Int. Cl.

| | | |
|---|---|---|
| *A01D 34/74* | (2006.01) | |
| *A01D 41/12* | (2006.01) | |
| *A01D 41/127* | (2006.01) | |
| *A01D 41/14* | (2006.01) | |

(52) U.S. Cl.
CPC ....... *A01D 41/1217* (2013.01); *A01D 41/127* (2013.01); *A01D 41/141* (2013.01)

(58) Field of Classification Search
USPC ......................................................... 701/50
See application file for complete search history.

(56) References Cited

U.S. PATENT DOCUMENTS

| | | | | |
|---|---|---|---|---|
| 2006/0026939 | A1* | 2/2006 | Kormann ............. | A01D 43/085 56/10.2 E |
| 2016/0135365 | A1* | 5/2016 | Cleodolphi .......... | A01D 41/141 56/10.2 E |
| 2019/0082598 | A1* | 3/2019 | Seiders, Jr. .......... | A01D 41/141 |
| 2020/0367432 | A1* | 11/2020 | Fuchtling ............... | A01D 34/14 |
| 2021/0329840 | A1* | 10/2021 | Craig ................... | A01D 43/073 |

OTHER PUBLICATIONS

European Patent Office, International Search Report related to International Patent Application No. PCT/IB2021/055188, mail date Sep. 13, 2021.

* cited by examiner

BASECUTTER HEIGHT CALIBRATION FOR SUGARCANE HARVESTERS

CROSS-REFERENCE TO RELATED APPLICATIONS

This patent application is a national phase entry under 36 U.S.C. § 371 of International Patent Application PCT/IB2021/056188, filed Jun. 12, 2021, designating the United States of America and published in English as International Patent Publication WO 2022/003461 A1 on Jan. 6, 2022, which claims priority benefit with regard to all common subject matter of earlier-filed U.S. Provisional Patent Application Ser. No. 63/047,360, filed on Jul. 2, 2020, and entitled "BASECUTTER HEIGHT CALIBRATION FOR SUGARCANE HARVESTERS", which is hereby incorporated by reference in its entirety into the present application.

BACKGROUND

Sugarcane harvesters are large moveable agricultural machines that harvest and partially process sugarcane. A typical sugarcane harvester cuts sugarcane stalks from sugarcane plants as it moves through the plants, strips leaves from the sugarcane stalks, cuts the sugarcane stalks into billets, and ejects the leaves, stems, and other waste material back onto the sugarcane field where they act as fertilizers.

A conventional sugarcane harvester includes basecutters with rotating blades that sever sugarcane stalks from sugarcane plants. The basecutters are ideally positioned close to the ground so as to capture as much of the sugarcane stalks as possible, but they should not be positioned too low or they will contact the ground when the harvester is driven over uneven surfaces. Other variables such as crop density and harvester speed may also affect the ideal basecutter height. Operators typically select and adjust the basecutter height before starting a harvesting operation, but it is difficult and time-consuming to change the height after harvesting has begun, so many operators select an unnecessarily high height to avoid unwanted ground contact.

SUMMARY

The present invention solves at least some of the above-described problems and related problems and provides a distinct advance in the art of sugarcane harvesters. More particularly, the present invention provides a sugarcane harvester that automatically calibrates an operational height of its basecutters before and/or during harvesting to achieve maximum cutting capabilities while avoiding unwanted ground contact.

A sugarcane harvester constructed in accordance with an embodiment of the invention broadly comprises an intake and cutting assembly; a chopping section; a discharge assembly; and a height adjustment system. Among other functions, the height adjustment assembly automatically calibrates an operational height of the basecutters.

The intake and cutting assembly cuts sugarcane stalks from sugarcane plants as the sugarcane harvester moves through the plants. The intake and cutting assembly may include a topper to cut off the leafy top portions of the sugarcane plants, one or more crop divider scrolls to divide and separate the sugarcane plants, one or more knockdown rollers to knock down the sugarcane plants, the above-described basecutters, and a feed section to feed the sugarcane stalks rearwardly to the chopping section. In one embodiment, the basecutters include rotary blades operated by at least one hydraulic motor.

The chopping section receives the sugarcane stalks from the intake and cutting assembly and chops or otherwise cuts the sugarcane stalks into billets. In one embodiment, the chopping section includes blades or other chopping mechanisms operated by at least one hydraulic motor.

The discharge assembly is positioned at or near the rear of the harvester and receives the sugarcane billets from the chopping section and then discharges the billets into a wagon or other storage vehicle that travels alongside the harvester. The discharge assembly may comprise elevators, conveyors, or the like that lift the billets to an elevated position and discharge the billets to a wagon or other storage vehicle or mechanism following the harvester. In one embodiment, the discharge assembly includes at least one hydraulic motor for driving the elevators, conveyors, or the like.

The harvester may also include one or more extractor fans or blowers that separate leaves, stems, and other crop residue from the billets and discharges the debris back into the sugarcane field.

In accordance with an important aspect of the invention, the height adjustment system calibrates an operational height of the basecutters to achieve maximum cutting capabilities while avoiding unwanted ground contact. An embodiment of the height adjustment system includes a height adjustment mechanism for raising or lowering the basecutters; a sensor that monitor operational aspects of the basecutters; and a processing system that receives signals from the sensor and calibrates an operational height of the basecutters in response to the sensor signals.

In one embodiment, the sensor includes a pressure sensor that monitors the hydraulic pressure associated with the basecutter motor. This monitored pressure is representative of the load on the basecutter motor. If the basecutters touch the ground, the load increases, and the pressure sensor readings spike. The processing system monitors this to determine a height or setting of the basecutters when they contact the ground as described below.

In other embodiments, the height adjustment system may include other sensors that directly or indirectly monitor the load of the basecutter motors to aid in the calibration. For example, the height adjustment system may include a sensor to monitor the hydraulic pressure of the chopping section motor.

To calibrate the operational height of the basecutters, the height adjustment system first lowers the basecutters toward the ground while monitoring an operational aspect of the basecutters. In one embodiment, the monitored operational aspect is the hydraulic pressure of the basecutter motor as sensed by the basecutter motor pressure sensor. When the hydraulic pressure spikes or exceeds a pre-determined threshold value, the processing system determines the basecutters have contacted the ground.

The processing system then obtains and saves data representative of a height or setting of the basecutters when the basecutters contact the ground. This height data may represent a setting or position of the height adjustment mechanism. After the height data is saved, the processing system directs the height adjustment mechanism to again raise and lower the basecutters until they again strike the ground. The processing system then again obtains and saves data representative of the height or setting of the basecutters when they are in contact with the ground. These steps are repeated at least twice and preferably 3-5 times. The harvester may be moved forward or rearward after each raising/lowering cycle to compensate for any ground compaction or ruts caused by the basecutters striking the ground.

Each raising/lowering cycle saves basecutter height data, with each set of data representative of the height or setting of the basecutters when they contact the ground. The processing system then calibrates the operational height of the basecutters based on this data. In one embodiment, the processing system determines an average height or setting of the basecutters when they contact the ground and then selects the operational height of the basecutters to be a selected distance above this average height. For example, if the above raising/lowering cycles are repeated 4 times and result in ground contact heights of 1 cm, 2 cm, 2 cm, and 1 cm, the processing system determines the average height or setting of the basecutters when they contact the ground is 1.5 cm. If the desired operational height of the basecutters is 5 cm above the ground surface, the processing system directs the height adjustment mechanism to position the basecutters at a height or setting of 6.5 cm, which positions the basecutters 5 cm above the ground.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
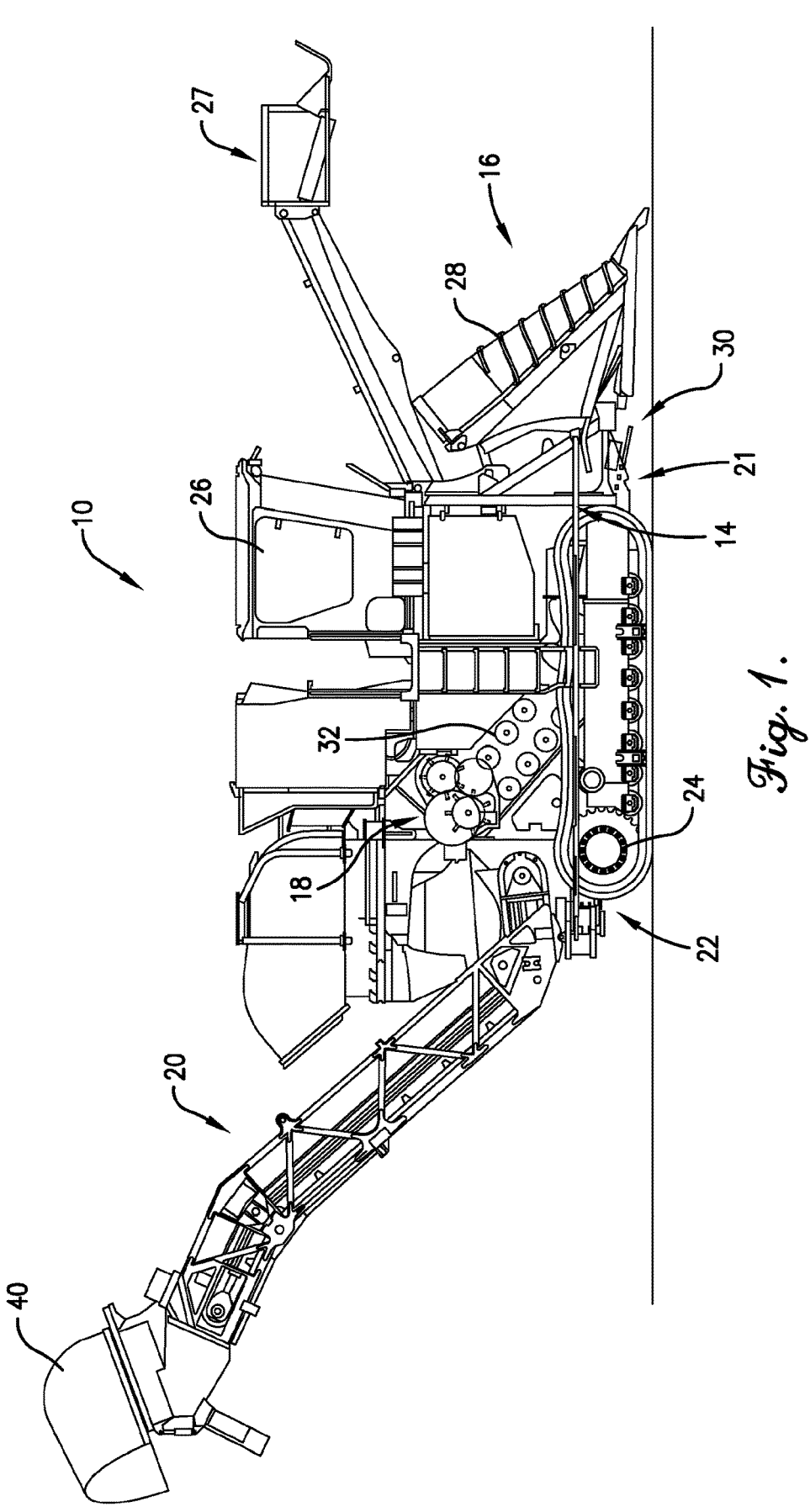
FIG. 1 is side elevational view of a sugarcane harvester constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

Turning now to the drawing figures, a sugarcane harvester 10 constructed in accordance with embodiments of the invention is illustrated. As explained in more detail below, the sugarcane harvester 10 automatically calibrates an operational height of its basecutters to achieve maximum cutting capabilities while avoiding unwanted ground contact.

An embodiment of the sugarcane harvester broadly comprises a movable chassis 14; an intake and cutting assembly 16; a chopping section 18; and a discharge assembly 20. Other embodiments of the sugarcane harvester 10 may have additional and/or different components.

The chassis 14 has a forward end 21 and a rearward end 22 disposed along a longitudinal axis that is essentially parallel to a ground surface over which the harvester travels.

The chassis 14 rides on wheels, belts, or other ground-engaging traction elements 24 that are driven by conventional motors, transmissions, and associated mechanical and electrical components. An operator's station 26 may be supported on top the chassis, although the harvester may also include various sensors and controls that provide autonomous operation without direct operator control.

The intake and cutting assembly 16 is supported on the forward end 21 of the chassis 14 for cutting sugarcane stalks from sugarcane plants as the sugarcane harvester moves through the plants. The intake and cutting assembly 16 may include a topper 27 to cut off the leafy top portions of the sugarcane plants, one or more crop divider scrolls 28 to divide and separate the sugarcane plants, one or more knockdown rollers to knock down the sugarcane plants, one or more basecutter assemblies 30 to sever sugarcane stalks from the sugarcane plants, and a feed section 32 to feed the sugarcane stalks rearwardly to the chopping section 18.

The basecutter assemblies 30 include rotary blades or other cutting implements and at least one hydraulic motor 32 (FIG. 2) or other drive mechanism for rotating the blades. The basecutters 30 can be adjusted up or down by height adjustment mechanism 34 (FIG. 2) so the blades are any distance above the ground as described in more detail below.

The chopping section 18 is supported between the forward and rearward ends of the chassis 14 and receives the sugarcane stalks from the intake and cutting assembly 16 and chops or otherwise cuts the sugarcane stalks into billets. In one embodiment, the chopping section includes chopping blades and a hydraulic motor 36 (FIG. 2) for driving the chopping blades.

In some embodiments, the sugarcane harvester 10 also comprises an internal bin or other storage mechanism supported on the chassis 14 between the chopping section 18 and the discharge assembly 12 for storing a quantity of the billets before they are discharged from the harvester.

The discharge assembly 20 is positioned at or near the rear of the harvester and receives the sugarcane billets from the chopping section 18 and discharges the billets into a wagon or other storage vehicle that travels alongside the harvester. The discharge assembly may comprise elevators, conveyors, and the like that receive the billets from the chopping section 18, elevate the billets, and discharge them from the harvester. In one embodiment, the discharge assembly comprises at least one hydraulic motor 38 (FIG. 2) for driving the elevators or conveyors.

The discharge assembly 20 may also comprise one or more extractor fans 40 or blowers that direct pressurized air over the billets to separate leaves, stems, and other crop residue from the billets and discharge the debris back into the sugarcane field.

In accordance with an important aspect of the invention, the sugarcane harvester also comprises a height adjustment system 42 that automatically calibrates an operational height of the basecutters 30 to achieve maximum cutting capabilities while avoiding unwanted ground contact. The height adjustment system 42 may be incorporated in a control system of the harvester or may be a stand-alone system.

Figure 2:
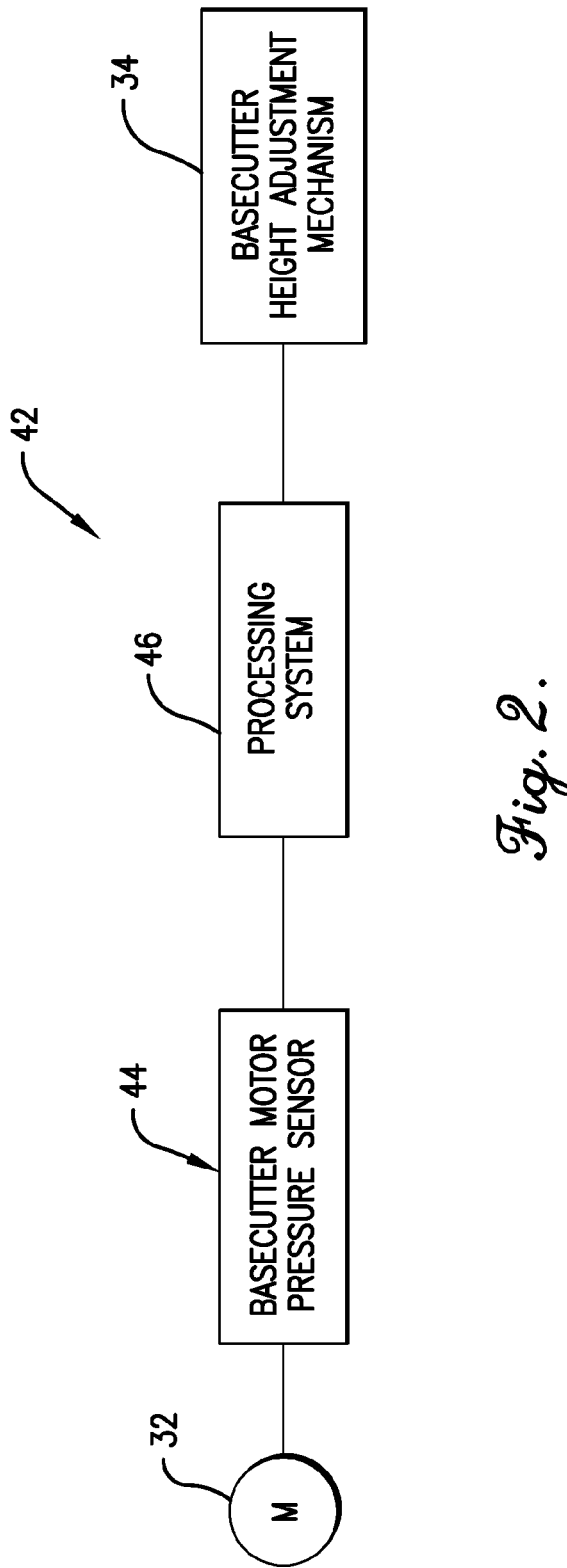
FIG. 2 is a block diagram of an exemplary height adjustment system for the sugarcane harvester.

An embodiment of the height adjustment system 42 is depicted in FIG. 2. and broadly includes the height adjustment mechanism 34; a sensor 44; and a processing system 46. The height adjustment system may also include conventional power and control circuits and relays and data transfer devices for sending and receiving data.

The height adjustment mechanism 34 includes hydraulic motors, cylinders, or other mechanisms for raising or lowering the basecutters 30. The mechanism 34 may also include or be coupled with hydraulic valves, relays, actuators, or other control mechanisms that can be controlled by the processing system 46.

The sensor 44 monitor an operational aspect of the basecutters 30 or other driven components of the harvester that are directly or indirectly proportional to a load on the basecutters. In one embodiment, the sensor 44 includes a pressure sensor that monitors the hydraulic pressure associated with the basecutter motor 32. This monitored pressure is representative of the load on the basecutter motor. If the basecutters touch the ground, the load increases, and the pressure sensor readings spike. The processing system 46 monitors this to determine a height of the basecutters when they contact the ground.

In other embodiments, the height adjustment system may include other sensors that directly or indirectly monitor the load of the basecutters so as to calibrate the basecutter height adjustment. For example, the system may include a sensor that monitors the hydraulic pressure of the chopping section motor. These are just examples of sensors that may be used to implement the functional aspects of the invention described herein and may be replaced with or supplemented with any other sensors that directly or indirectly monitor loads on the basecutters.

The processing system 46 receives signals from the sensor 44 and calibrates an operational height of the basecutters to achieve maximum cutting capabilities while avoiding unwanted ground contact. The processing system may be any type of circuitry or other computing elements that are operable to receive signals from the sensor 44 and provide control and/or power signals to the height adjustment mechanism 34. The processing elements may be coupled with suitable relays, switches, and/or valves and may be programmed with logic or a number of routines, subroutines, applications, or instructions for performing the instructions described herein. The processing system 46 may also include or be coupled with communication elements for sending data to remote control devices and for receiving instructions from the remote devices.

Figure 3:
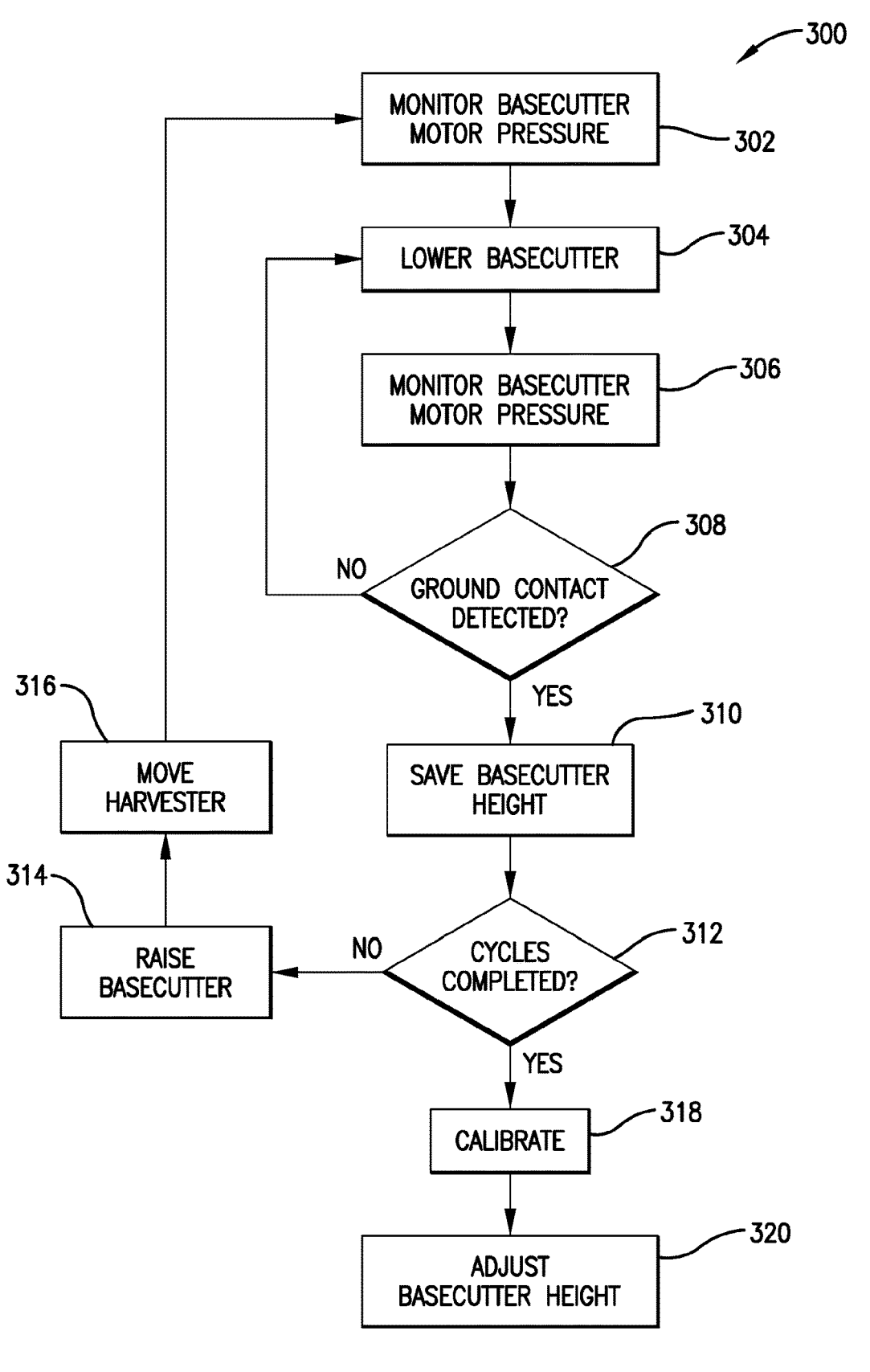
FIG. 3 is a flow diagram depicting exemplary steps in a method of the present invention and/or steps performed by a control system of the present invention.

FIG. 3 depicts exemplary steps in a method 300 of calibrating an operational height of the basecutters. These steps may be performed in any order and/or supplemented or replaced with other steps. Some of the steps may be implemented with the processing system 46 or another computing device.

The processing system 46 first receives signals from the pressure sensor 44 to monitor the load on the basecutter motor 32 as depicted in step 302. The processing system then directs the height adjustment mechanism 34 to lower the basecutters as depicted in step 304. While the basecutters are being lowered, the processing system 46 continues to monitor the basecutter motor pressure as depicted in step 306.

In step 308, the processing system 46 determines if the basecutters have contacted the ground based on the basecutter motor pressure. The processing system detects ground contact when the hydraulic pressure spikes or exceeds a pre-determined threshold value. The threshold level may be fixed or variable and may be any value greater than an average motor pressure experienced while operating the harvester with no contact between the basecutters and the ground. A rapidly increasing pressure reading may also indicate ground contact.

If the processing system 46 determines the basecutters have not yet touched the ground, the method returns to steps 304 and 306 where the basecutters continue to be lowered and the basecutter motor pressure continues to be monitored.

If the processing system determines in step 308 that the basecutters have touched the ground, the method continues to step 310 where the processing system 46 obtains and saves data representative of a height or setting of the basecutters when they contact the ground. This height data may be a setting or position of the height adjustment mechanism 34 or any other data that represents a position of the basecutters.

After the height data is saved, the method continues to step 312 to determine if the desired number of raising/lowering cycles have been completed. If not, the method moves to steps 314 and 316, where the processing system 46 directs the height adjustment mechanism to raise the basecutters and then directs the harvester to move forward or backward to compensate for any ground compaction or ruts caused by the basecutter striking the ground. The processing system then repeats steps 302-312 until the desired number of raising/lowering cycles have been completed. These raising/lowering cycles repeated at least twice and preferably 3-5 times.

Each time a raising/lowering cycle is completed, the processing system 40 obtains and saves data representative of the height of the basecutters when they contact the ground. Once the desired number of raising/lowering cycles are completed, the method proceeds to step 318 where the processing system 46 calibrates the operational height of the basecutter based on this data.

In one embodiment, the processing system 46 determine an average height or setting of the basecutters when they contact the ground and then selects the operational height to be a selected distance above this average height. For example, if the above raising/lowering cycles are repeated 4 times and result in ground contact heights of 1 cm, 2 cm, 2 cm, and 1 cm, the processing system determines the average height or setting of the basecutter when the basecutter contacts the ground is 1.5 cm. If the desired operational height of the basecutters is 5 cm above the ground surface, the processing system 46 then directs the height adjustment mechanism to position the basecutters at a height or setting of 6.5 cm.

In other embodiments, the processing system determines a median height of the basecutters when they contact the ground to calibrate the operational height. In other embodiments, only one raising/lowering cycle is performed, and the processing system calibrates the operational height based on one height reading.

The above calibration steps are preferably performed before a harvesting operation and may be repeated at intervals during a harvesting operation. The calibration step may also be performed whenever a sensor senses uneven ground on which the harvester operates.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing system, element, or the like may be implemented as special purpose or as general purpose. For example, the processing system 46 may comprise dedicated circuitry or logic that is permanently configured, such as an application-specific integrated circuit (ASIC), or indefinitely configured, such as an FPGA, to perform certain operations. The processing system may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing system" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A sugarcane harvester for harvesting sugarcane stalks from sugarcane plants, the sugarcane harvester comprising:

an intake and cutting assembly for cutting the sugarcane stalks from the sugarcane plants as the sugarcane harvester moves through the sugarcane plants, the intake and cutting assembly including a basecutter for cutting bases of the sugarcane plants;

a chopping section for receiving the sugarcane stalks from the intake and cutting assembly and chopping the sugarcane stalks into billets;

a discharge assembly for receiving the billets from the chopping section and discharging the billets to a wagon or other storage vehicle or mechanism; and a height adjustment system for calibrating an operational height of the basecutter by:

(a) while the sugarcane harvester is stationary, lowering the basecutter toward a ground surface;

(b) monitoring an operational aspect of the basecutter to determine if the basecutter has contacted the ground surface;

(c) obtaining and saving data representative of a height of the basecutter when the basecutter contacts the ground;

(d) raising the basecutter away from the ground surface;

(e) moving the sugarcane harvester forward or backward;

(f) repeating (a) to (e) to obtain and save at least two sets of data, each set of data representative of a height of the basecutter when the basecutter contacts the ground;

(g) calibrating the operational height of the basecutter based on the sets of data bv analyzing the sets of data to determine an average height of the basecutter when the basecutter contacts the ground, wherein the operational height is a height a selected distance above the average height of the basecutter when the basecutter contacts the ground.

2. The sugarcane harvester as set forth in claim 1, wherein the height adjustment system comprises a height adjustment mechanism for raising and lowering the basecutter.

3. The sugarcane harvester as set forth in claim 2, wherein the height adjustment mechanism comprises a hydraulic motor or cylinder for raising and lowering the basecutter.

4. The sugarcane harvester as set forth in claim 1, wherein the height adjustment system comprises a sensor for monitoring the operational aspect of the basecutter.

5. The sugarcane harvester as set forth in claim 4, wherein the basecutter includes a rotary blade and a hydraulic motor for rotating the blade, wherein the sensor for monitoring the operational aspect of the basecutter comprises a pressure sensor for monitoring a hydraulic pressure associated with the hydraulic motor of the basecutter.

6. The sugarcane harvester as set forth in claim 5, wherein the monitoring step includes comparing the hydraulic pressure with a threshold pressure value to determine if the basecutter has contacted the ground surface.

7. The sugarcane harvester as set forth in claim 4, wherein the height adjustment system further comprises a processing system for receiving signals from the sensor and performing the calibrating step.

8. The sugarcane harvester as set forth in claim 1, wherein the processing system calibrates the operational height of the basecutter before a harvesting operation and at least once during the harvesting operation.

9. A method of calibrating an operational height of a basecutter of a sugarcane harvester, the method comprising:

(a) while the sugarcane harvester is stationary, lowering the basecutter toward a ground surface;

(b) monitoring an operational aspect of the basecutter to determine if the basecutter has contacted the ground surface;

(c) once the monitoring step indicates the basecutter has contacted the ground surface, obtaining and saving data representative of a height of the basecutter when the basecutter contacts the ground;

(d) raising the basecutter away from the ground surface;

(e) moving the sugarcane harvester forward or backward;

(f) repeating steps (a) to (e) to obtain and save at least two sets of data, each set of data representative of a height of the basecutter when the basecutter contacts the ground;

(g) calibrating the operational height of the basecutter based on the sets of data by analyzing the sets of data to determine an average height of the basecutter when the basecutter contacts the ground, wherein the operational height is a height a selected distance above the average height of the basecutter when the basecutter contacts the ground.

10. The method as set forth in claim 9, wherein the basecutter includes a rotary blade and a hydraulic motor for rotating the blade, wherein the operational aspect of the basecutter is a hydraulic pressure associated with the hydraulic motor of the basecutter.

11. The method as set forth in claim 10, wherein the monitoring step includes comparing the hydraulic pressure with a threshold pressure value to determine if the basecutter has contacted the ground surface.

12. The method as set forth in claim 9, wherein the selected distance is 5 cm.

13. The method as set forth in claim 9, wherein steps (a)-(e) are repeated at least 3 times.

14. The method as set forth in claim 9, wherein steps (a)-(e) are repeated at least 5 times.

15. The method as set forth in claim 9, further comprising raising the basecutter to the operational height.

* * * * *